US012269261B2

(12) United States Patent
Bosoku et al.

(10) Patent No.: US 12,269,261 B2
(45) Date of Patent: Apr. 8, 2025

(54) PROCESSING APPARATUS AND RECORDING APPARATUS

(71) Applicant: SEIKO EPSON CORPORATION, Tokyo (JP)

(72) Inventors: Makoto Bosoku, Matsumoto (JP); Shun Ito, Matsumoto (JP); Atsuhiko Takeuchi, Matsumoto (JP); Yosuke Nakano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/515,715

(22) Filed: Nov. 21, 2023

(65) Prior Publication Data

US 2024/0165976 A1 May 23, 2024

(30) Foreign Application Priority Data

Nov. 21, 2022 (JP) ................................ 2022-185564

(51) Int. Cl.
*B41J 11/58* (2006.01)
*B41J 15/04* (2006.01)
*B65H 31/22* (2006.01)

(52) U.S. Cl.
CPC .................................. *B41J 15/046* (2013.01)

(58) Field of Classification Search
None
See application file for complete search history.

(56) References Cited

U.S. PATENT DOCUMENTS

2014/0292980 A1* 10/2014 Horie ...................... B41J 15/04 347/104
2015/0273897 A1 10/2015 Kato et al.
2021/0009377 A1* 1/2021 de la Hoz Matveeva .................. B65H 31/20
2022/0111668 A1 4/2022 Yato et al.

FOREIGN PATENT DOCUMENTS

JP 2015-189559 A 11/2015
JP 2022-064292 A 4/2022

* cited by examiner

*Primary Examiner* — Leslie J Evanisko
(74) *Attorney, Agent, or Firm* — Dority & Manning, P.A.

(57) ABSTRACT

A processing apparatus includes a processing unit and a medium reception unit. The medium reception unit includes a flexible sheet-shaped reception member, a turning shaft coupled to one end of the reception member, an operation part coupled to the other end of the reception member, a pair of supporting parts configured to support both ends of the operation part, a rack provided to supporting parts, and a turning shaft gear configured to the rack. The reception member is wound around the turning shaft and housed inside the housing when the operation part approaches the turning shaft. The reception member is drawn out from the turning shaft to hang downward such that the medium is receivable when the operation part is separated from the turning shaft. A non-linkage structure in which the movement of the operation part and the turning of the turning shaft are temporarily not linked is provided.

7 Claims, 11 Drawing Sheets

PROCESSING APPARATUS AND RECORDING APPARATUS

The present application is based on, and claims priority from JP Application Serial Number 2022-185564, filed Nov. 21, 2022, the disclosure of which is hereby incorporated by reference herein in its entirety.

BACKGROUND

1. Technical Field

The present disclosure relates to a processing apparatus and a recording apparatus.

2. Related Art

In the related art, various processing apparatuses such as recording apparatuses are used as processing apparatuses for processing a medium. A processing apparatus including a medium reception unit that receives a processed medium is known. For example, JP-A-2022-64292 discloses a processing apparatus including a medium reception unit including a sheet-shaped reception member that can be housed inside when the medium is not received, and can be drawn out to a position where the medium is receivable when the medium is received.

The medium reception unit of the processing apparatus disclosed in JP-A-2022-64292 includes a sheet-shaped reception member that can be housed inside the housing and a turning shaft, and the medium ejected from the housing is receivable when the reception member is drawn out from the turning shaft. In the medium reception unit with such a configuration, the reception member may not be normally drawn out depending on the material and flexibility of the reception member. One reason for this is that, for example, the reception member forcefully goes upward and the reception member is caught by the operation unit in an early period of drawing of the reception member, and thereafter, when the reception member wound around the turning shaft is drawn out through the movement of the operation part, the outer reception member wound around the turning shaft does not follow the rotation of the turning shaft and the rotation of the inner reception member. In addition, another reason is that the frictional resistance of the reception member making contact with the component of the processing apparatus is excessively greater than the mass of the reception member, and consequently the reception member is less dropped and the drawing amount of the reception member becomes insufficient.

SUMMARY

A processing apparatus for solving the above-mentioned problems of the present disclosure includes a processing unit housed in a housing and configured to process a medium; and a medium reception unit configured to receive the medium ejected from the housing. The medium reception unit includes a reception member having a sheet shape with flexibility, a turning shaft provided inside the housing and coupled to one end of the reception member, an operation part coupled to the other end of the reception member and configured to separate from the turning shaft, a pair of supporting parts protruding movably forward and backward from the housing in a forward/backward direction along a separation direction of the operation part from the turning shaft, and support both ends of the operation part, a rack provided at at least one of the pair of supporting parts, and a turning shaft gear provided at the turning shaft and configured to turn in linkage with a movement of the rack, when the operation part approaches the turning shaft, the reception member is wound around the turning shaft and housed inside the housing, when the operation part separates from the turning shaft, the reception member is drawn out from the turning shaft to hang downward such that the medium is receivable, and at least one of the rack and the turning shaft gear has a non-linkage structure in which a movement of the operation part and turning of the turning shaft are temporarily not linked while the operation part is separated from the turning shaft.

In addition, a recording apparatus for solving the above-mentioned problems of the present disclosure includes a recording unit housed in a housing and configured to perform recording on a medium; and a medium reception unit configured to receive the medium ejected from the housing. The medium reception unit includes a reception member having a sheet shape with flexibility, a turning shaft provided inside the housing and coupled to one end of the reception member, an operation part coupled to the other end of the reception member and configured to separate from the turning shaft, a pair of supporting parts protruding movably forward and backward from the housing in a forward/backward direction along a separation direction of the operation part from the turning shaft, and support both ends of the operation part, a rack provided at at least one of the pair of supporting parts, and a turning shaft gear provided at the turning shaft and configured to turn in linkage with a movement of the rack, when the operation part approaches the turning shaft, the reception member is wound around the turning shaft and housed inside the housing, when the operation part separates from the turning shaft, the reception member is drawn out from the turning shaft to hang downward such that the medium is receivable, and at least one of the rack and the turning shaft gear has a non-linkage structure in which a movement of the operation part and turning of the turning shaft are temporarily not linked while the operation part is separated from the turning shaft.

DESCRIPTION OF EMBODIMENTS

Figure 1:
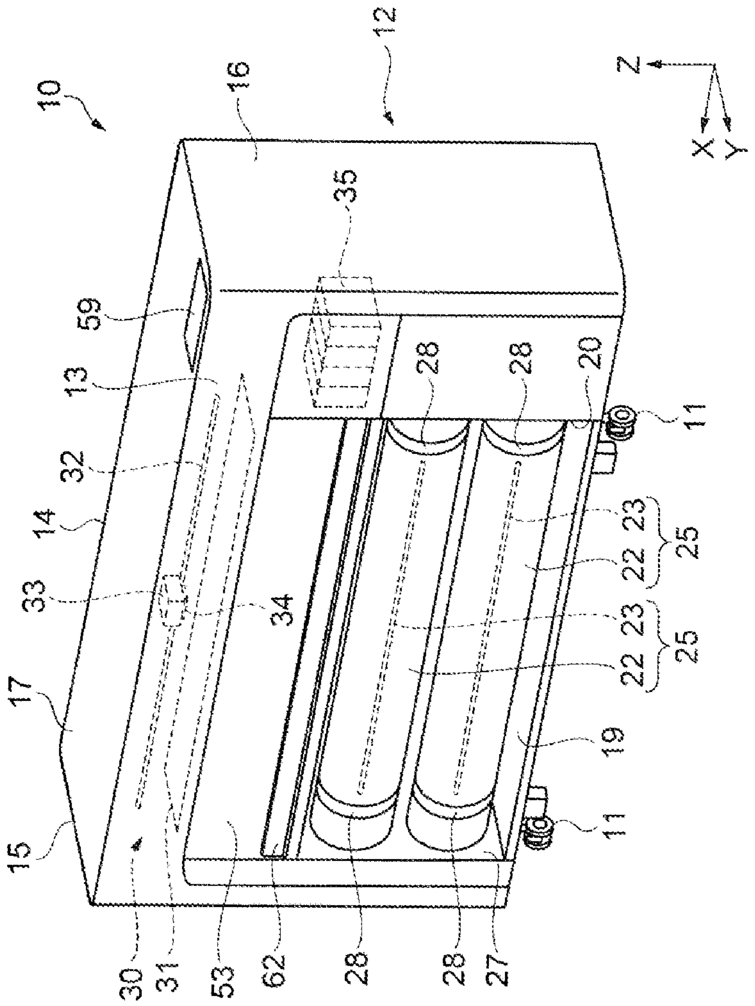
FIG. 1 is a perspective view illustrating a configuration of a recording apparatus of an example 1 serving as a processing apparatus according to an embodiment.

First, the present disclosure is schematically described.

A processing apparatus of the first aspect for solving the above-mentioned problems of the present disclosure includes a processing unit housed in a housing and configured to process a medium; and a medium reception unit configured to receive the medium ejected from the housing. The medium reception unit includes a reception member having a sheet shape with flexibility, a turning shaft provided inside the housing and coupled to one end of the reception member, an operation part coupled to the other end of the reception member and configured to separate from the turning shaft, a pair of supporting parts protruding movably forward and backward from the housing in a forward/backward direction along a separation direction of the operation part from the turning shaft, and support both ends of the operation part, a rack provided at at least one of the pair of supporting parts, and a turning shaft gear provided at the turning shaft and configured to turn in linkage with a movement of the rack, when the operation part approaches the turning shaft, the reception member is wound around the turning shaft and housed inside the housing, when the operation part separates from the turning shaft, the reception member is drawn out from the turning shaft to hang downward such that the medium is receivable, and at least one of the rack and the turning shaft gear has a non-linkage structure in which a movement of the operation part and turning of the turning shaft are temporarily not linked while the operation part is separated from the turning shaft.

According to this aspect, the sheet-shaped reception member that receives the medium has a configuration in which it is wound around the turning shaft and housed inside the housing when the operation part approaches the turning shaft, whereas it is drawn out from the turning shaft to hang downward such that the medium is receivable when the operation part is separated from the turning shaft, and at least one of the rack and the turning shaft gear has a non-linkage structure in which the movement of the operation part and the turning of the turning shaft are temporarily not linked while the operation part is separated from the turning shaft. That is, a section in which the turning shaft does not temporarily turn while the operation part is separated from the turning shaft can be provided. For example, by providing this section in an early period of the drawing of the reception member, the distance between the operation part and the turning shaft is increased, and the reception member can be drawn out after setting a state where the reception member easily hangs downward even in a case where a reception member with a high stiffness or the like is used and the like, for example. With this configuration, for example, it is possible to reduce a situation where the reception member forcefully goes upward beyond the operation part and the reception member is caught by the operation part in an early period of the drawing of the reception member and the like, and thus the reception member can be favorably drawn out.

In the processing apparatus of the second aspect in the first aspect, the non-linkage structure includes a toothless region where the turning shaft gear does not turn by not having teeth of the rack in part over one pitch or more of teeth of a gear that fit the teeth of the rack.

According to this aspect, the toothless region where the turning shaft gear does not turn by not having teeth of the rack in part over one pitch or more of teeth of a gear that fit the teeth of the rack is provided. That is, a section where the turning shaft does not temporarily turn for a sufficient length, not just for a backlash, can be provided. With this configuration, the reception member can be favorably drawn out.

In the processing apparatus of the third aspect in the second aspect, the toothless region is provided on the operation part side than a center in the forward/backward direction in the rack.

According to this aspect, the toothless region is provided on the operation part side than a center in the forward/backward direction in the rack. That is, the toothless region is provided at a portion corresponding to an early period of drawing of the reception member. With this configuration, it is possible to reduce a situation where the reception member forcefully goes upward beyond the operation part and the reception member is caught by the operation part in an early period of the drawing of the reception member and the like can be suppressed, and thus the reception member can be favorably drawn out.

In the processing apparatus of the fourth aspect in the second aspect, the toothless region is provided on an opposite side of a center from the operation part in the forward/backward direction in the rack.

According to this aspect, the toothless region is provided on an opposite side of a center from the operation part in the forward/backward direction in the rack. That is, the toothless region is provided at a portion corresponding to a later period of drawing of the reception member. With this configuration, the user can adjust the drawing amount of the reception member in a later period of drawing of the reception member such as upon completion of the drawing of the reception member.

In the processing apparatus of the fifth aspect in the first aspect, the non-linkage structure includes an idling mechanism in which the turning shaft gear idles on the turning shaft even when the turning shaft gear turns in linkage with the movement of the rack.

According to this aspect, an idling mechanism in which the turning shaft gear idles on the turning shaft even when the turning shaft gear turns in linkage with the movement of the rack is provided. With this configuration, the non-linkage structure can be formed without forming the toothless region in the rack.

The processing apparatus of the sixth aspect in one of the first to fifth aspects further includes a speed-increasing mechanism provided between the rack and the turning shaft gear and configured to increase a speed of turning of the turning shaft gear such that a drawing amount of the reception member is greater than a movement amount of the pair of supporting parts.

According to this aspect, the speed-increasing mechanism is provided between the rack and the turning shaft gear. With this configuration, it is not necessary to enlarge the turning shaft for winding the reception member, and the apparatus can be downsized.

A recording apparatus of the seventh aspect includes a recording unit housed in a housing and configured to perform recording on a medium; and a medium reception unit configured to receive the medium ejected from the housing. The medium reception unit includes a reception member having a sheet shape with flexibility, a turning shaft provided inside the housing and coupled to one end of the reception member, an operation part coupled to the other end of the reception member and configured to separate from the turning shaft, a pair of supporting parts protruding movably forward and backward from the housing in a forward/backward direction along a separation direction of the operation part from the turning shaft, and support both ends of the operation part, a rack provided at at least one of the pair of supporting parts, and a turning shaft gear provided at the turning shaft and configured to turn in linkage with a movement of the rack, when the operation part approaches the turning shaft, the reception member is wound around the turning shaft and housed inside the housing, when the operation part separates from the turning shaft, the reception member is drawn out from the turning shaft to hang downward such that the medium is receivable, and at least one of the rack and the turning shaft gear has a non-linkage structure in which a movement of the operation part and turning of the turning shaft are temporarily not linked while the operation part is separated from the turning shaft.

According to this aspect, the sheet-shaped reception member that receives the medium has a configuration in which it is wound around the turning shaft and housed inside the housing when the operation part approaches the turning shaft, whereas it is drawn out from the turning shaft to hang downward such that the medium is receivable when the operation part is separated from the turning shaft, and at least one of the rack and the turning shaft gear has a non-linkage structure in which the movement of the operation part and the turning of the turning shaft are temporarily not linked while the operation part is separated from the turning shaft. That is, a section in which the turning shaft does not temporarily turn while the operation part is separated from the turning shaft can be provided. For example, by providing this section in an early period of the drawing of the reception member, the distance between the operation part and the turning shaft is increased, and the reception member can be drawn out after setting a state where the reception member easily hangs downward even in a case where a reception member with a high stiffness or the like is used and the like, for example. With this configuration, for example, it is possible to reduce a situation where the reception member forcefully goes upward beyond the operation part and the reception member is caught by the operation part in an early period of the drawing of the reception member and the like, and thus the reception member can be favorably drawn out.

Example 1

Embodiments according to the present disclosure are described in detail below with reference to the accompanying figures. First, a schematic configuration of a recording apparatus 10 of an example 1 as a processing apparatus according to an embodiment of the present disclosure is described with reference to FIGS. 1 to 10. In the coordinates indicated in the figures, three virtual axes orthogonal to each other are set as X axis, Y axis and Z axis on the assumption that the recording apparatus 10 is placed on a horizontal installation surface. The X axis is a virtual axis parallel to the left-right direction of the recording apparatus 10. The Y axis is a virtual axis parallel to the front-rear direction of the recording apparatus 10. The Z axis is a virtual axis parallel to the height direction of the recording apparatus 10. The tip side of the arrows indicating the X axis, the Y axis and the Z axis is "+side", and the bottom side is "−side". The recording apparatus 10 includes a recording unit 30 that performs recording on a medium as a processing unit. The recording apparatus 10 of this example is a large format printer that feeds a rolled long medium 22 and performs ink-jet recording. A large format printer is a printer that can perform recording on a long medium with a width equal to or greater than 297 mm corresponding to the short side width of the A3 size.

Figure 2:
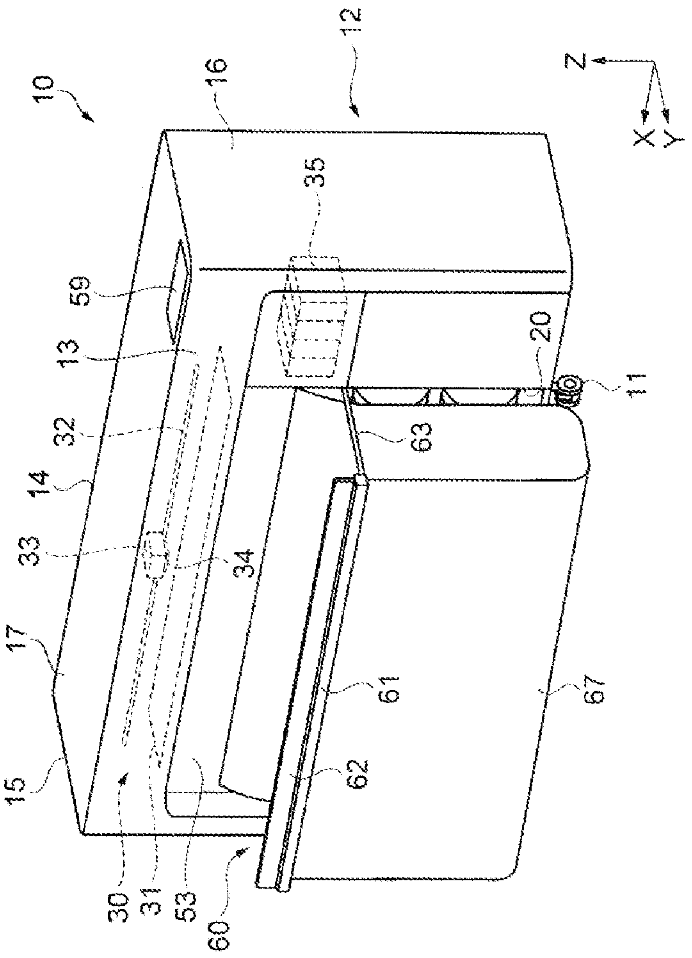
FIG. 2 is a perspective view illustrating the recording apparatus of the example 1 in a state (separated state) where an operation part is most moved backward with respect to a front wall of a housing.
Figure 3:
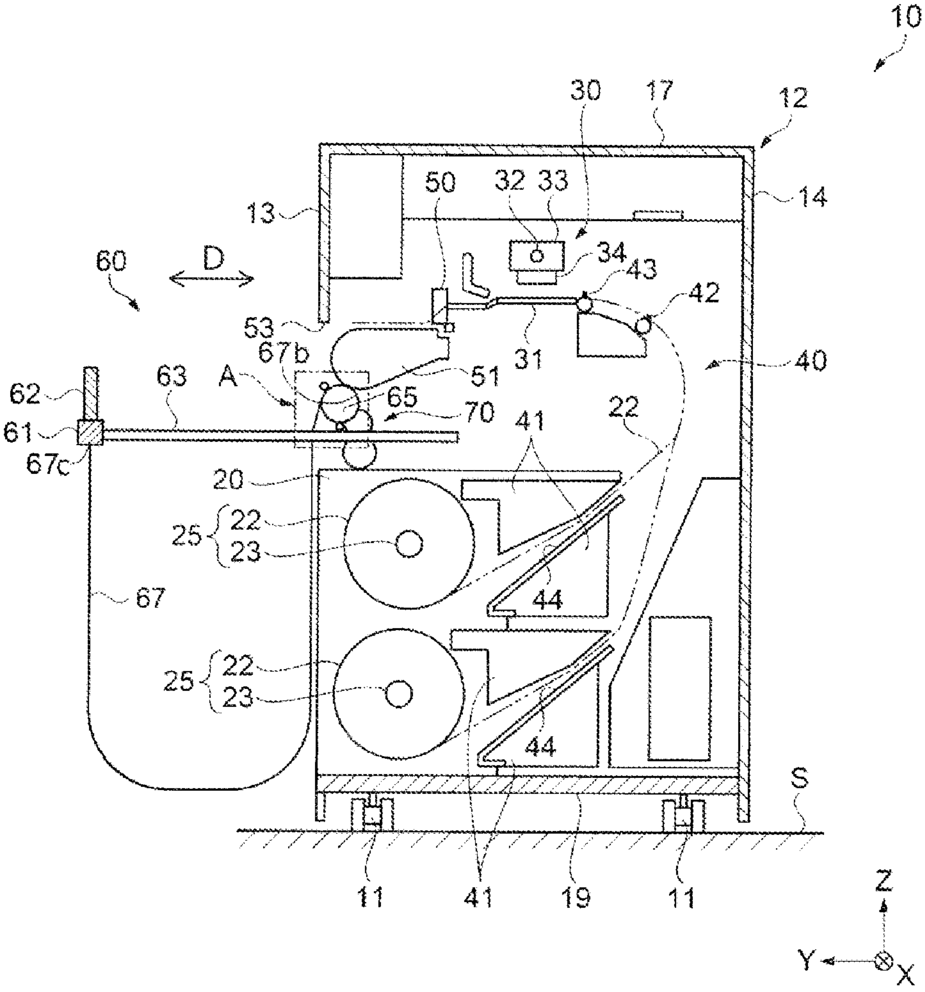
FIG. 3 is a sectional view illustrating an internal configuration of the recording apparatus of the example 1, and illustrating a separated state.

As illustrated in FIGS. 1, 2, and 3, the recording apparatus 10 includes the recording unit 30 that is housed in a housing 12 and performs recording on the medium 22, and a medium reception unit 60 that receives the medium 22 ejected from the housing 12.

The recording apparatus 10 includes the housing 12 with a substantially cuboid shape that is long in the left-right direction. The housing 12 includes a front wall 13, a rear wall 14, a first side wall 15, a second side wall 16, and an upper wall 17. The housing 12 is coupled with a base frame 19 supported by a leg part 11. The recording apparatus 10 is installed on an installation surface S through the leg part 11. In the recording apparatus 10, the Z direction in which the base frame 19 and the upper wall 17 face each other is the height direction of the recording apparatus 10. The X direction in which the first side wall 15 and the second side wall 16 face each other is the left-right direction of the recording apparatus 10. The Y direction in which the front wall 13 and the rear wall 14 face each other is the front-rear direction of the recording apparatus 10. In the case where the recording apparatus 10 is disposed on a horizontal plane, the Z direction is the direction parallel to the vertical line. Note that the X direction corresponds to the width direction, and corresponds to the axis direction of a turning shaft 65 described later.

A housing part 20 that houses a roll 25 of the medium 22 wound in a cylindrical form, a conveyance part 40 that conveys the medium 22, and a cutting part 50 that cuts the medium 22 are provided inside the housing 12, in addition to the recording unit 30 that performs recording on the medium 22.

A plurality of openings is formed in the front wall 13 of the housing 12. A roll housing port 27 for housing the roll 25 is formed on the base frame 19 side and on the lower side in the front wall 13. In addition, an opening 53 is formed on the upper side of the roll housing port 27. Opening 53 functions as a sheet ejection port for ejecting the recorded medium 22, and a drawing port for drawing out a reception member 67 described later that receives the ejected medium 22. The medium 22 is ejected from the upper side of the opening 53, and the reception member 67 is drawn out from the lower side of the opening 53. In this embodiment, a configuration in which the sheet ejection port and the drawing port are formed as one opening 53 is exemplified, but the sheet ejection port and the drawing port may be provided independently of each other.

In the housing part 20, the cylindrical roll 25 formed of the long medium 22 wound around a core member 23 is detachably housed from the roll housing port 27. In this embodiment, the housing part 20 is configured to be able to house the two rolls 25 that are long in the X direction and disposed side by side in the Z direction. At both ends of the roll 25, a pair of holding members 28 for rotatably holding it with respect to the housing part 20 is attached. When the roll 25 is driven into rotation, the medium 22 wound around the roll 25 is output to the rear wall 14 side in the housing 12.

The conveyance part 40 conveys the medium 22 output from the roll 25. The conveyance part 40 includes a conveyance path formation part 41, an intermediate roller 42, and a conveyance roller 43. The conveyance path formation part 41 is provided for each of the two rolls 25. The conveyance path formation part 41 is located on the rear wall 14 side with respect to each of the two rolls 25 housed in the housing part 20. The conveyance path formation part 41 forms a conveyance path 44 that guides, to the rear wall 14 side of the housing 12, the medium 22 output from the roll 25 driven into rotation.

The intermediate roller 42 and the conveyance roller 43 convey, to the recording unit 30, the medium 22 past the conveyance path 44. The intermediate roller 42 and the conveyance roller 43 are composed of a driving roller and a driven roller that are a pair of rollers supported in a rotatable manner around the axis extending along the X direction as the turning axis. The intermediate roller 42 and the conveyance roller 43 sandwich the medium 22 with the driving roller and the driven roller from the front and rear sides. When the driving roller of the intermediate roller 42 and the conveyance roller 43 is driven into rotation, the medium 22 is conveyed to a support base 31 through the conveyance path 44, and conveyed from the rear wall 14 side to the front wall 13 side on the support base 31. Note that while FIG. 3 illustrates a state where the medium 22 is output from both of the two rolls 25, the medium 22 is output from one of the two rolls 25 during the actual recording.

The recording unit 30 is composed of the support base 31, a guide shaft 32, a carriage 33, and a recording head 34. The support base 31 is located on the upper wall 17 side than the housing part 20. The support base 31 is a plate-shaped member extending in the X direction in the housing 12, and supports the medium 22 conveyed by the conveyance part 40. The guide shaft 32 is located on the upper wall 17 side than the support base 31. The guide shaft 32 is a rod-shaped member extending in the X direction. The guide shaft 32 supports the carriage 33 in a slidable manner The recording head 34 is mounted in the carriage 33. The recording head 34 is located on the support base 31 side with respect to the carriage 33. The recording head 34 is configured to be able to move back and forth along the guide shaft 32 together with the carriage 33. The recording head 34 is coupled with a cartridge 35 storing ink through a flexible tube not illustrated in the figure. The cartridge 35 is housed at a position on the second side wall 16 side than the housing part 20, and on the upper wall 17 side than the housing part 20. The recording head 34 performs recording on the medium 22 by ejecting ink to the medium 22 supported by the support base 31, while moving to the X direction.

The cutting part 50 is located on the front wall 13 side than the recording unit 30. The cutting part 50 includes a fixed blade and a movable blade that is movable with respect to the fixed blade, and the cutting part 50 cuts the medium 22 located between the fixed blade and the movable blade. The cut medium 22 is supported by the sheet ejection port member 51 that guides the medium 22 to the upper side of the opening 53 formed in the front wall 13, and ejected to the outside of the housing 12.

In addition, the recording apparatus 10 includes an input unit 59. The input unit 59 is provided at the top surface of the upper wall 17 of the housing 12. The input unit 59 is located at a corner between a portion where the front wall 13 is coupled to the upper wall 17 and a portion where the second side wall 16 is coupled to the upper wall 17. The input unit 59 is composed of a liquid crystal display apparatus provided with a touch panel, and is used when the user input a variety of information, for example.

As illustrated in FIG. 3 and the like, the medium reception unit 60 is composed of an operation part 61, a supporting part 63, the turning shaft 65, the reception member 67, and the like. The turning shaft 65 is provided between the housing part 20 and the sheet ejection port member 51 inside the housing 12. The turning shaft 65 has a cylindrical shape that is long in the X direction with a length greater than the width of the medium 22. The turning shaft 65 is supported in a turnable manner with respect to the housing 12.

The operation part 61 is a rod-shaped member that is long in the X direction. The both ends of the operation part 61 are supported by a pair of the supporting parts 63 that protrudes from the front wall 13 side of the housing 12 and is movable forward and backward in the +Y direction. The pair of supporting parts 63 protrudes to the outside of the housing 12 from the location between the turning shaft 65 and the housing part 20. Specifically, the operation part 61 can be separated from the housing 12, and can be displaced between a mounted state where it is mounted to the housing 12 and a separated state where it is separated from the housing 12 along with the forward/backward movement of the pair of supporting parts 63.

The reception member 67 is a flexible long sheet-shaped member. As illustrated in FIGS. 3 to 7, one end 67*b* of the reception member 67 is coupled to the turning shaft 65, and the other end 67*c* of the reception member 67 is coupled to a coupling part 61*a* of the operation part 61. The turning shaft 65 is configured to rotate forward or reverse in linkage with the forward/backward movement of the supporting part 63.

Figure 8:
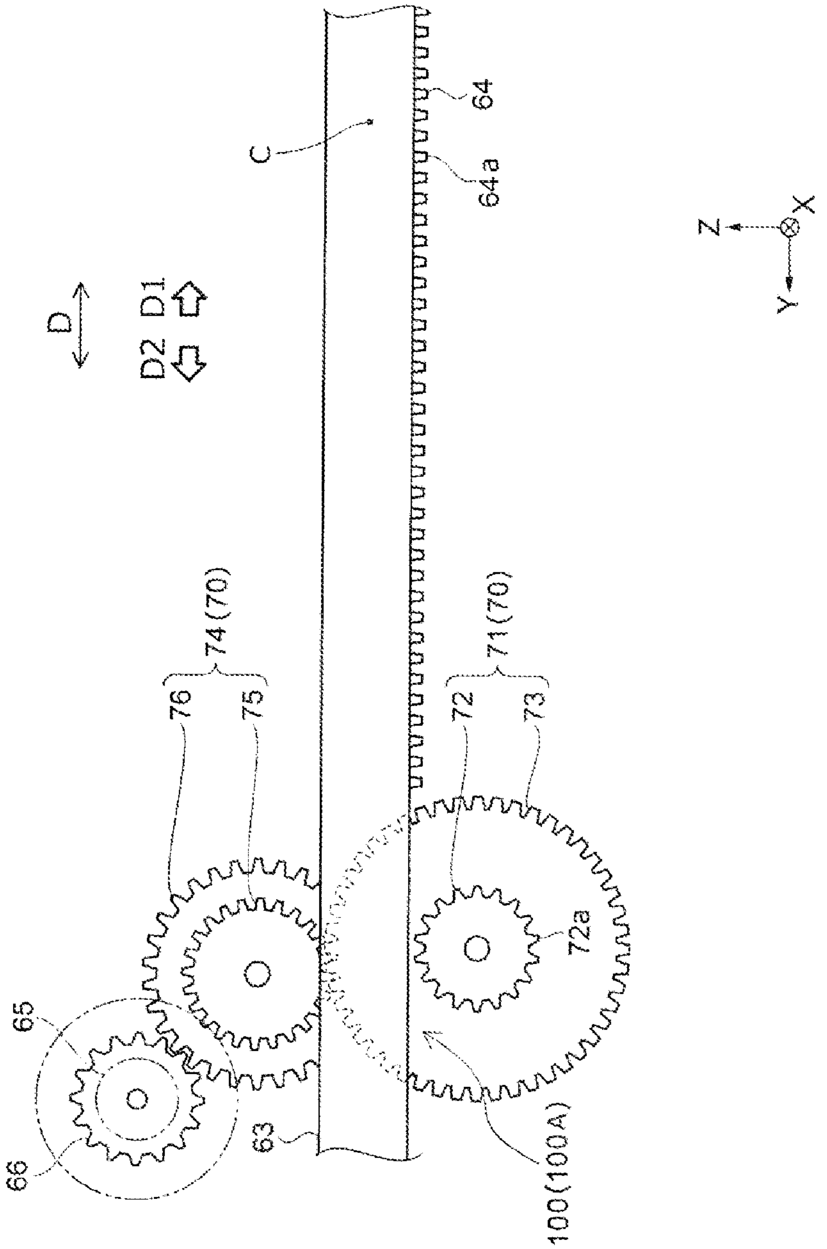
FIG. 8 is a plan view illustrating a power transfer configuration between a supporting part and a turning shaft of the recording apparatus of the example 1 as viewed from the side surface, and illustrating a mounted state.
Figure 9:
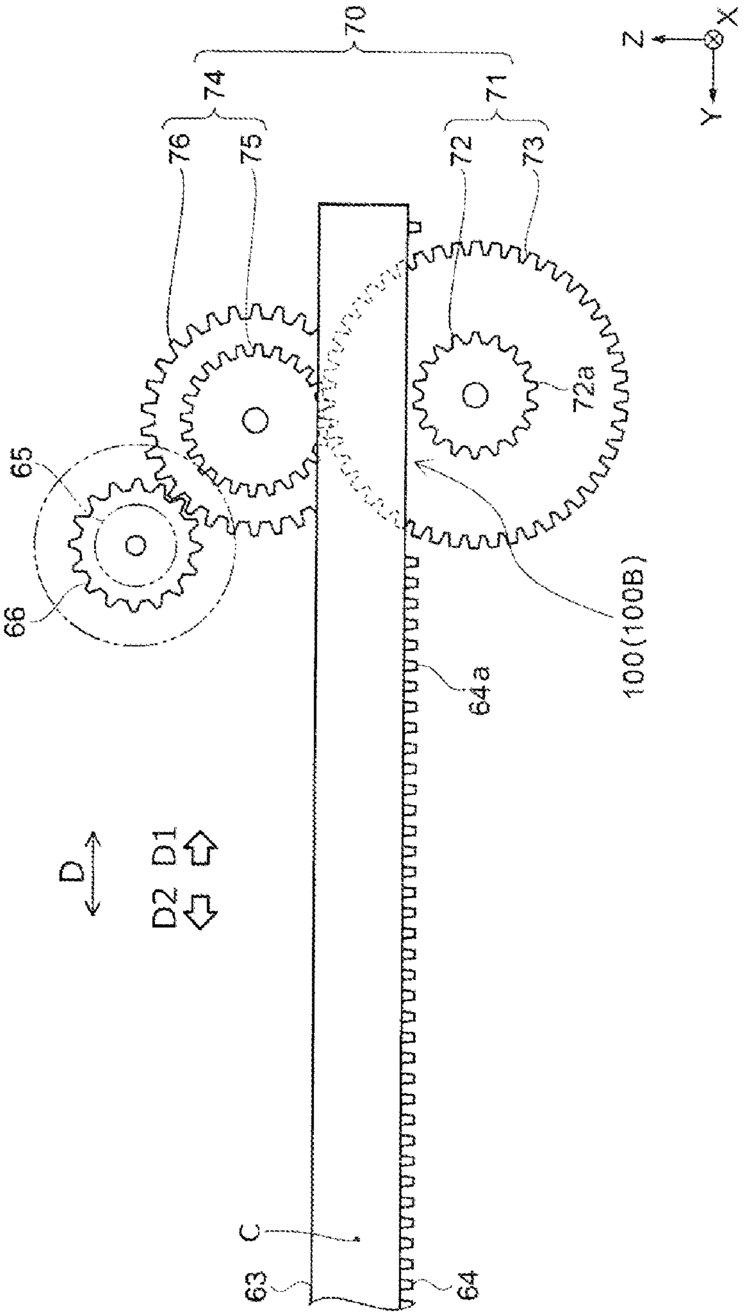
FIG. 9 is a plan view illustrating the power transfer configuration between the supporting part and the turning shaft of the recording apparatus of the example 1 as viewed from the side surface, and illustrating a separated state.
Figure 10:
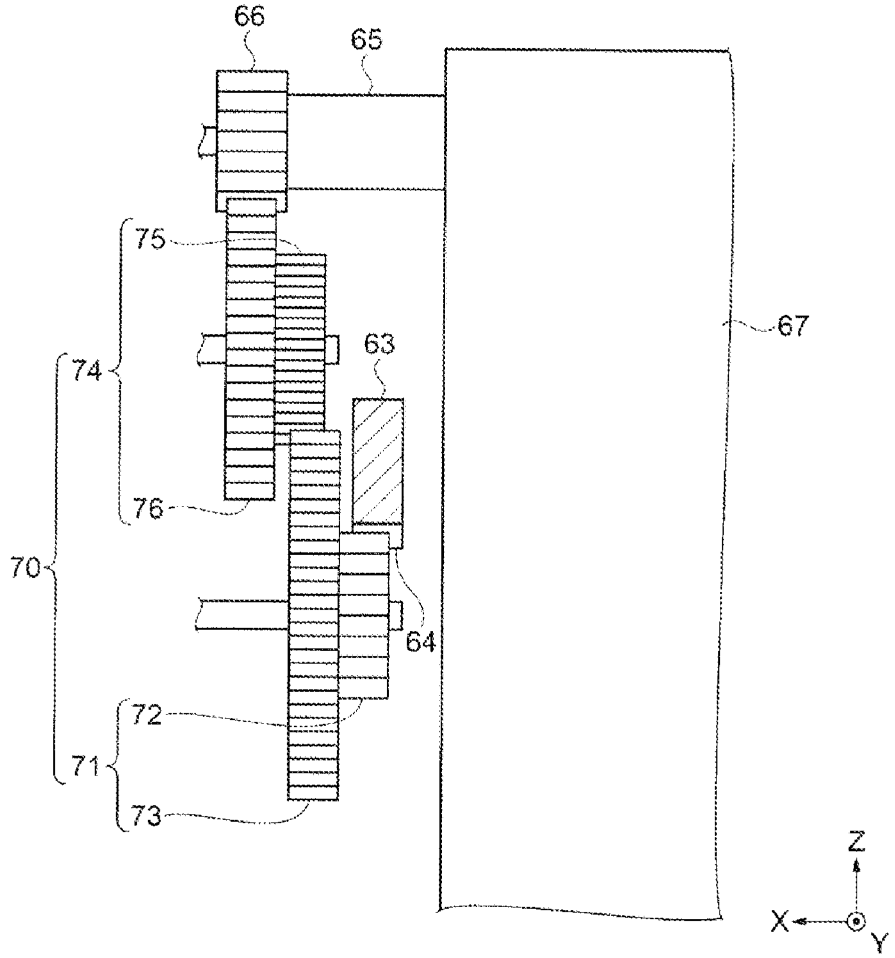
FIG. 10 is a plan view illustrating the power transfer configuration between the supporting part and the turning shaft of the recording apparatus of the example 1 as viewed from the front surface.

As illustrated in FIGS. 8 to 10, at least one of the pair of supporting parts 63 is provided with a rack 64. The rack 64 is composed of a plate-shaped rod provided with a plurality of teeth at a constant pitch. In the recording apparatus 10 of this embodiment, the rack 64 is provided at the −Z side surfaces of the supporting parts 63. On the other hand, the turning shaft 65 is provided with a turning shaft gear 66 that turns in linkage with the movement of the rack 64. The turning shaft gear 66 is provided to rotate around the same axis as the turning shaft 65, and the turning shaft 65 turns when the turning shaft gear 66 turns. Further, a speed-increasing mechanism 70 that increases the speed of the turning of the turning shaft gear 66 is provided between the rack 64 and the turning shaft gear 66. Note that the specific configuration of the rack 64 is described later.

The speed-increasing mechanism 70 includes a first composite gear 71 and a second composite gear 74 as composite gears with a stack of gears with different number of teeth. In the first composite gear 71, a first gear 72 that engages with the rack 64 and a second gear 73 with a larger diameter and a larger number of teeth than the first gear 72 are formed around the same axis. When the rack 64 and the first gear 72 engage with each other, a straight movement along with the forward/backward movement of the supporting part 63 is converted into the rotational force of the first composite gear 71. In the second composite gear 74, a third gear 75 that engages with the second gear 73 and has a smaller diameter and a smaller number of teeth than the second gear 73, and a fourth gear 76 that has a larger diameter and a larger number of teeth than the third gear 75 are formed around the same axis.

For example, when the number of teeth of the second gear 73 is twice the number of teeth of the first gear 72, the third gear 75 that engages with the second gear 73 rotates twice as fast as when the first gear 72 and the third gear 75 directly engage with each other. That is, the first composite gear 71 increases the rotational speed of the second composite gear 74. Likewise, the second composite gear 74 increases the rotational speed of the turning shaft gear 66. Note that while the speed-increasing mechanism 70 composed of the two gears, the first composite gear 71 and the second composite gear 74, is exemplified in this embodiment, it may be a speed-increasing mechanism composed of one composite gear, or three or more composite gears. In addition, it is possible to adopt a speed-increasing mechanism composed of a combination of a plurality of large and small spur gears with different diameters and numbers of teeth.

Figure 4:
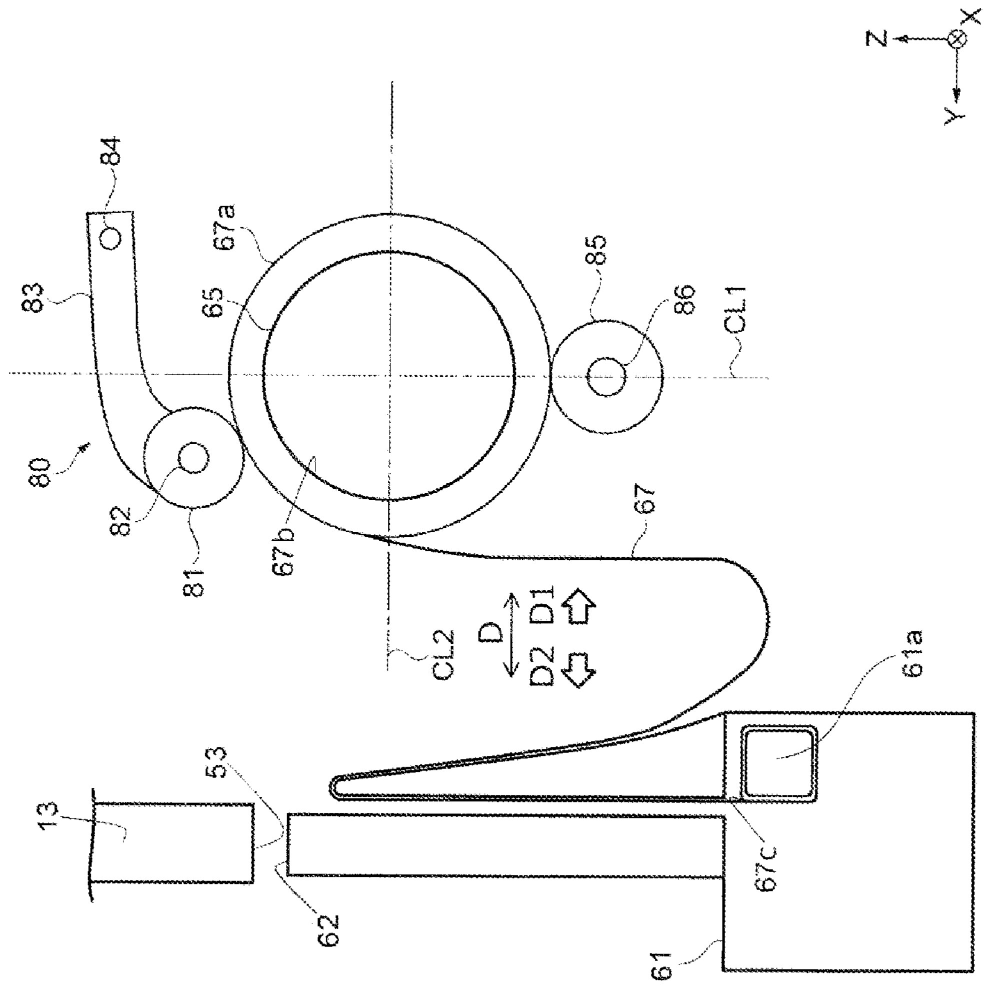
FIG. 4 is an enlarged view of a portion corresponding to a region A in FIG. 3 in an enlarged manner, and a state (mounted state) where the operation part is most moved forward with respect to the front wall of the housing.
Figure 5:
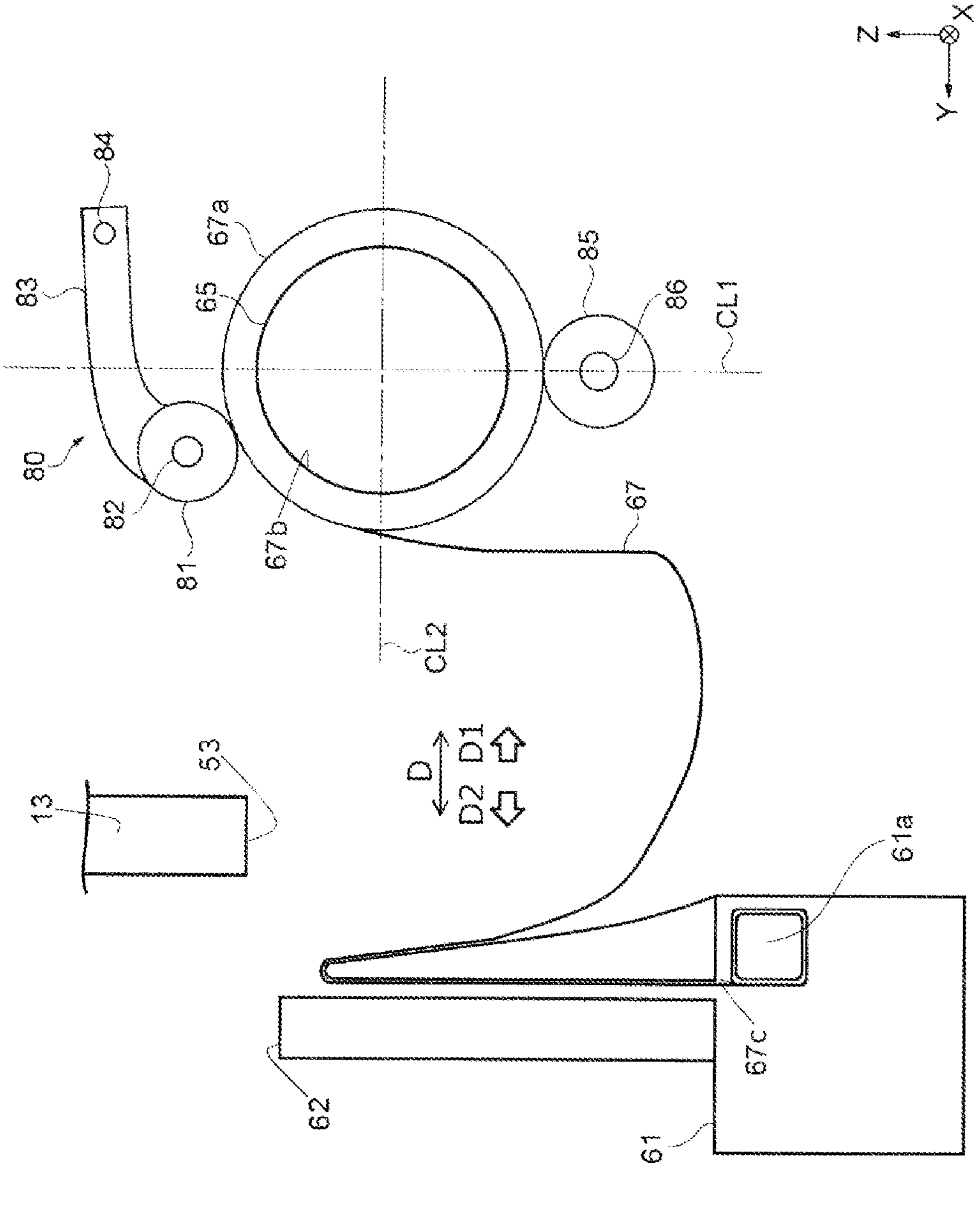
FIG. 5 is an enlarged view illustrating a portion corresponding to the region A in FIG. 3 in an enlarged manner, and a state where the operation part begins to move backward with respect to the front wall of the housing from the state of FIG. 4.
Figure 6:
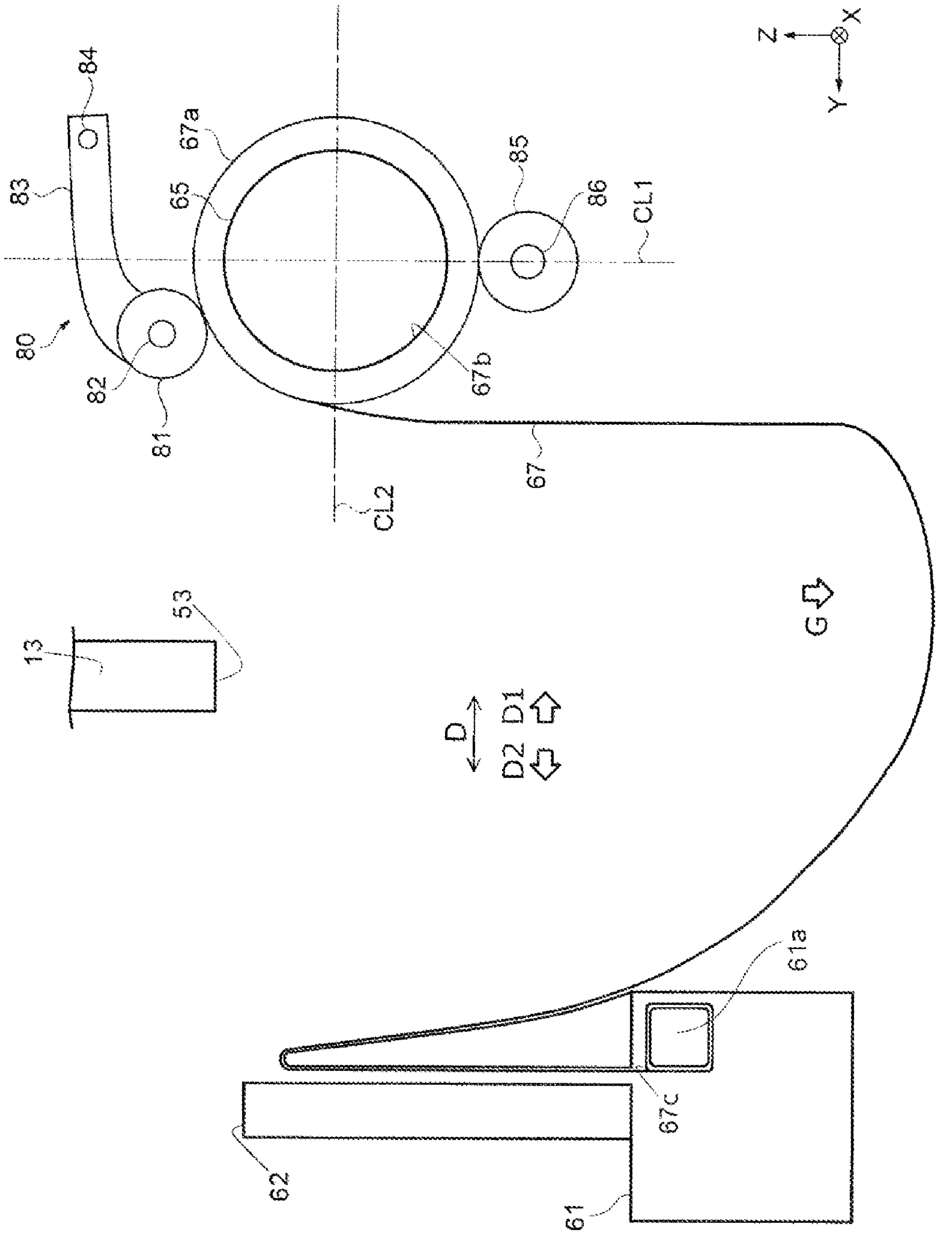
FIG. 6 is an enlarged view illustrating a portion corresponding to the region A in FIG. 3 in an enlarged manner, and a state where the operation part is further moved backward with respect to the front wall of the housing from the state of FIG. 5.
Figure 7:
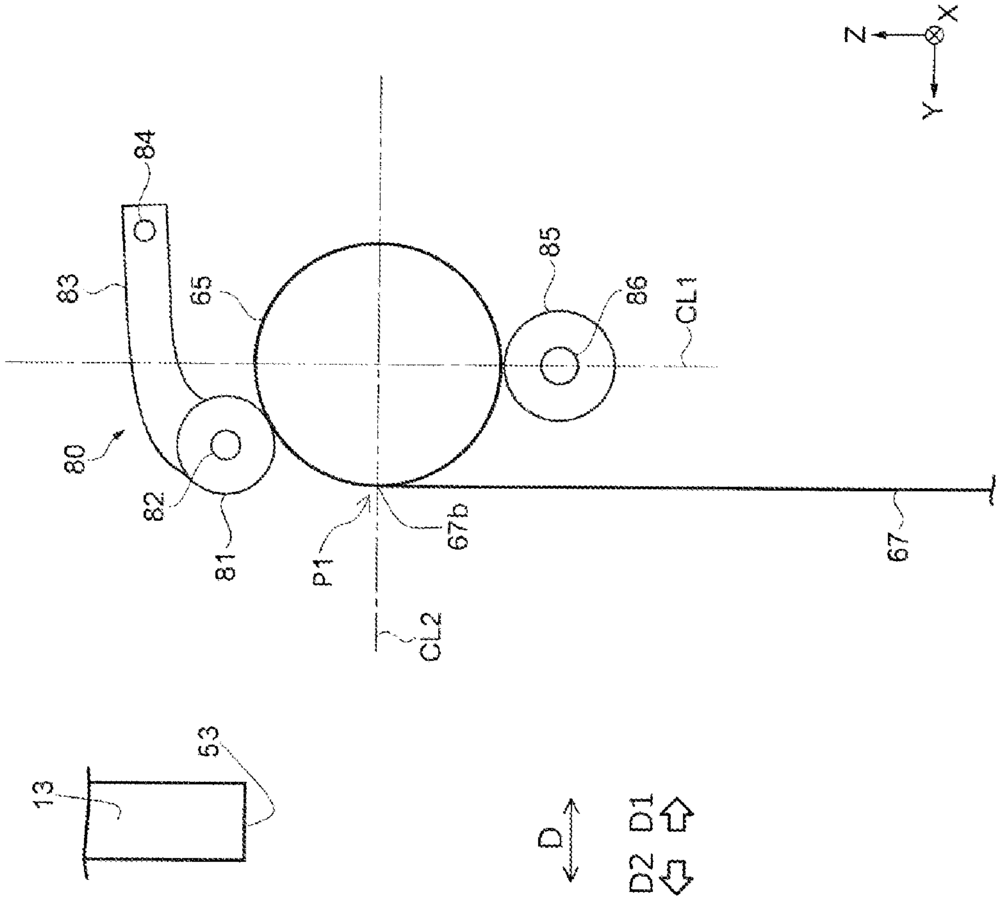
FIG. 7 is an enlarged view illustrating a portion corresponding to the region A in FIG. 3 in an enlarged manner, and illustrating a separated state.

When the operation part 61 is displaced from the separated state illustrated in FIGS. 3 and 7 to the mounted state illustrated in FIG. 4 through the state illustrated in FIGS. 6 and 5, the reception member 67 is wound around the turning shaft 65 and housed inside the housing 12. In addition, when the operation part 61 is displaced from the mounted state illustrated in FIG. 4 to the separated state illustrated in FIGS. 3 and 7 through the state illustrated in FIGS. 5 and 6, the reception member 67 is drawn out to the outside of the housing 12 from the turning shaft 65 through the lower side of the opening 53, and set to a state capable of receiving the medium 22 ejected from the upper side of the opening 53. The recording apparatus 10 of this example is configured such that with the speed-increasing mechanism 70, the drawing amount of the reception member 67 drawn out from the turning shaft 65 is greater than the movement amount of the pair of supporting parts 63 in the +Y direction. In this manner, the reception member 67 forms a slack between the operation part 61 and the turning shaft 65.

The operation part 61 includes a front plate 62 making up a part of the front wall 13 of the housing 12 in the mounted state illustrated in FIG. 4. The front plate 62 is a plate-shaped member that is long in the X direction raised in the +Z direction from the operation part 61. At least a part of the opening 53 is closed with the front plate 62 when the operation part 61 is in the mounted state. As illustrated in FIG. 4, the front plate 62 forms the same surface as the front wall 13 in the mounted state. In this embodiment, when the lower portion of the opening 53 where the reception member 67 is drawn out is closed with the front plate 62.

Note that a configuration in which the drawing amount of the reception member 67 is greater than the movement amount of the supporting part 63 by using the speed-increasing mechanism 70 is exemplified in this example, this is not limitative. For example, a configuration in which the drawing amount of the reception member 67 is greater than the movement amount of the supporting part 63 can be achieved by using a turning shaft with a circumference greater than the movement amount of the supporting part 63 required to make one rotation of the turning shaft.

As illustrated in FIGS. 4 to 7, the medium reception unit 60 includes a contact part 80 and an auxiliary roller 85. The contact part 80 makes contact with an outer peripheral surface 67*a* of the rolled reception member 67 wound around the turning shaft 65 to press the reception member 67 to the turning shaft 65. The contact part 80 is provided at both end portions of the turning shaft 65 in the axis line direction, i.e., the X direction.

The contact part 80 includes a contact roller 81 and an arm 83. The contact roller 81 is a driven roller that makes contact with and follows the outer peripheral surface 67*a* of the reception member 67 that turns together with the turning shaft 65 during the winding around the turning shaft 65 or the drawing out. The arm 83 is located on the upper side of the turning shaft 65. One end of the arm 83 is located on the Y direction side than a vertical line CL1 intersecting the axis line of the turning shaft 65, and is supported in a turnable manner by an arm shaft 84 extending in the X direction. The other end of the arm 83 is located on the +Y direction side than the vertical line CL1 to support the contact roller 81 in a turnable manner through a contact roller shaft 82. Specifically, the contact roller 81 makes contact with the rolled reception member 67 between the straight line extending toward the +Z direction from the axis line of the turning shaft 65 in the vertical line CL1, and the straight line extending toward the +Y direction from the axis line of the turning shaft 65 in a horizontal line CL2 intersecting the axis line of the turning shaft 65.

With a pressing member not illustrated in the figure that presses the arm 83 downward, the contact roller 81 presses, to the turning shaft 65, the rolled reception member 67 wound around the turning shaft 65. In this manner, the contact roller 81 can be brought into contact with the outer peripheral surface 67*a* of the reception member 67 so as to follow the radius of the rolled reception member 67 that changes as the turning shaft 65 turns. Note that while the configuration in which the contact part 80 is provided at the both end portions of the turning shaft 65 is exemplified in this embodiment, it is possible to adopt a configuration in which a plurality of contact parts is further provided in addition to those at the both end portions.

The auxiliary roller 85 makes contact with the outer peripheral surface 67*a* of the rolled reception member 67 wound around the turning shaft 65 to press the reception member 67 to the turning shaft 65. The auxiliary roller 85 is a driven roller that makes contact with and follows the outer peripheral surface 67*a* of the reception member 67 that turns when wound around the turning shaft 65 or drawn out. The auxiliary roller 85 is located on the lower side than the horizontal line CL2 intersecting the axis line of the turning shaft 65, and is supported in a turnable manner through an auxiliary roller shaft 86. Further, preferably, the auxiliary roller 85 is provided at a position overlapping the vertical line CL1 intersecting the axis line of the turning shaft 65.

The auxiliary roller 85 presses, to the turning shaft 65, the rolled reception member 67 wound around the turning shaft 65 with a pressing member that presses the auxiliary roller shaft 86 upward. In this manner, the auxiliary roller 85 can be brought into contact with the outer peripheral surface 67*a* of the reception member 67 so as to follow the radius of the rolled reception member 67 that changes as the turning shaft 65 turns. One or more auxiliary rollers 85 are provided along the X direction of the turning shaft 65.

With the contact roller 81 and the auxiliary roller 85 pressing the reception member 67 to the turning shaft 65, the rotation of the turning shaft 65 is easily transmitted not only to the reception member 67 close to the turning shaft 65 but also to the outer peripheral surface 67*a* side. It should be noted that in this example, the movement of the operation part 61 and the turning of the turning shaft 65 are temporarily not linked with each other, and thus the distance between the operation part 61 and the turning shaft 65 is increased such that the reception member easily hangs downward. In addition, when the operation part 61 is separated from the turning shaft 65, the reception member

67 may be pulled by the operation part 61 with no the turning of the turning shaft 65 in some situation, thus applying a tension attracting the outer peripheral surface 67*a* of the reception member 67 to the turning shaft 65 side. In this manner, the reception member 67 can be normally drawn out even without providing the contact roller 81 and the auxiliary roller 85. In the case where the contact roller 81 and the auxiliary roller 85 are not provided, the components associated with the contact roller 81 and the auxiliary roller 85 become unnecessary, thus achieving cost reduction. In addition, the sound of the contact roller 81 and the auxiliary roller 85 rotating to follow the drawing and/or winding of the reception member 67 is not generated, thus reducing noise.

Here, the rotational direction of the turning shaft 65 when drawing the reception member 67 in the illustrated order of FIGS. 4, 5, 6 and 7 is counterclockwise in FIGS. 4 to 7. Conversely, the rotational direction of the turning shaft 65 when winding the reception member 67 around the turning shaft 65 in the illustrated order of FIGS. 7, 6, 5 and 4 is clockwise in FIGS. 4 to 7. Note that as elaborated later, strictly speaking, the turning shaft 65 does not turn in the displacement state from FIG. 4 to FIG. 5 when the reception member 67 is drawn out, and the turning shaft 65 does not turn in the displacement state from FIG. 5 to FIG. 4 when the reception member 67 is wound around the turning shaft 65. In addition, the rotational direction of the turning shaft 65 when the reception member 67 is drawn out may be clockwise in FIGS. 4 to 7, and the rotational direction of the turning shaft 65 when the reception member 67 is wound may be counterclockwise in FIGS. 4 to 7.

In this example, the recording apparatus 10 as a processing apparatus including the recording unit 30 that performs ink-jet recording as a processing unit is exemplified, but this is not limitative. The processing apparatus may be a recording apparatus, a copy apparatus, a fax apparatus, or a multifunctional device having these functions of a type other than the ink-jet type, or the like.

As described above, the recording apparatus 10 includes the recording unit 30 as a processing unit that is housed in the housing 12 and processes the medium 22, and the medium reception unit 60 that receives the medium 22 ejected from the housing 12. Further, the medium reception unit 60 includes the sheet-shaped reception member 67 with flexibility, the turning shaft 65 provided inside the housing 12 and coupled to the one end 67*b* of the reception member 67, the operation part 61 coupled to the other end 67*c* of the reception member 67 and provided to be able to separate from the turning shaft 65, and the pair of supporting parts 63 protruded so as to be movable forward and backward from the housing 12 in the forward/backward direction D illustrated in FIGS. 3 to 7 along the separation direction (the +Y direction) of the operation part 61 from the turning shaft 65 and configured to support the both ends of the operation part 61. Further, as illustrated in FIGS. 8 and 9, the medium reception unit 60 includes the rack 64 provided at at least at one of the pair of supporting parts 63, and the turning shaft gear 66 provided at the turning shaft 65 and configured to turn in linkage with the movement of the rack 64. Note that the direction D1 of the forward/backward direction D in FIGS. 4 to 7 corresponds to the forward direction of the operation part 61 with respect to the housing 12, and the direction D2 of the forward/backward direction D in FIGS. 4 to 7 corresponds to the backward direction of the operation part 61 with respect to the housing 12.

Here, the medium reception unit 60 is mainly described in more detail as a specific configuration of the rack 64. The reception member 67 of this example has a configuration in which it is wound around the turning shaft 65 and housed inside the housing 12 when the operation part 61 approaches the turning shaft 65, and it is drawn out from the turning shaft 65 to hang downward (a gravity direction G) such that the medium 22 can be received when the operation part 61 separates from the turning shaft 65. In this manner, the medium reception unit 60 can be housed in a narrow space, and a processing apparatus with a reduced apparatus size can be provided.

As illustrated in FIGS. 8 and 9, the medium reception unit 60 in the recording apparatus 10 of this example includes a toothless region 100A and a toothless region 100B in the rack 64, where the turning shaft gear 66 does not turn due to teeth 64*a* of the rack 64 partially not provided over one pitch or more of teeth 72*a* of the first gear 72. In the toothless region 100A and the toothless region 100B, the teeth 64*a* of the rack 64 and the teeth 72*a* of the first gear 72 do not fit each other, and therefore the first gear 72 does not rotate and the speed-increasing mechanism 70 is not driven even when the rack 64 moves in the forward/backward direction D. As a result, in the toothless region 100A and the toothless region 100B, the turning shaft 65 does not turn. In other words, the toothless region 100A and the toothless region 100B serve a role of a non-linkage structure 100 where the movement of the operation part 61 and the turning of the turning shaft 65 are temporarily not linked when the operation part 61 separates from the turning shaft 65. That is, a section where the turning shaft 65 does not temporarily turn for a sufficient length, not just for a backlash, can be provided.

As in the recording apparatus 10 of this example, it is preferable that at least one of the rack 64 and the turning shaft gear 66 is provided with the non-linkage structure 100 where the movement of the operation part 61 and the turning of the turning shaft 65 are temporarily not linked when the operation part 61 separates from the turning shaft 65. In other words, it is preferable to provide a section where the turning shaft 65 does not temporarily turn when the operation part 61 separates from the turning shaft 65. For example, by providing this section in an early period of drawing of the reception member 67, the distance between the operation part 61 and the turning shaft 65 is increased, and the reception member 67 can be drawn out after setting a state where the reception member 67 can easily hang downward with gravity even when the reception member 67 with a high stiffness or the like is used, for example. With this configuration, for example, it is possible to suppresses a situation where the reception member 67 forcefully goes upward beyond the operation part 61 and the reception member 67 is caught by the operation part 61 in an early period of drawing of the reception member 67 and the like, and thus the reception member 67 can be favorably drawn out.

Here, in the recording apparatus 10 of this example, as illustrated in FIG. 8, the toothless region 100A is provided on the operation part 61 side (the direction D2 side) than the center C in the forward/backward direction D in the rack 64. Specifically, the toothless region 100A is provided in a portion corresponding to an early period of drawing of the reception member 67. With such a configuration, the recording apparatus 10 of this example can reduce a situation where the reception member 67 forcefully goes upward beyond the operation part 61 in the +Y direction side in an early period of drawing of the reception member 67 and the reception member 67 is caught by the operation part 61 and the like, and can favorably feed the reception member 67. In the recording apparatus 10 of this example with such a configuration, the turning shaft 65 does not turn in linkage with the movement of the operation part 61 in the displacement state from FIG. 4 to FIG. 5 corresponding to an early period of drawing of the reception member 67, and the reception member 67 can be spread in the Y direction and hang downward with gravity even when the reception member 67 with a high stiffness or the like is used. In addition, in the recording apparatus 10 of this example with such a configuration, the turning shaft 65 does not turn in linkage with the movement of the operation part 61 even in the displacement state from FIG. 5 to FIG. 4 when the reception member 67 is wound around the turning shaft 65.

In addition, in the recording apparatus 10 of this example, as illustrated in FIG. 9, the toothless region 100B is provided on the side (the direction D1 side) opposite to the operation part 61 than the center C in the forward/backward direction D in the rack 64. Specifically, the toothless region 100B is provided at a portion corresponding to a later period of drawing of the reception member 67. In the recording apparatus 10 of this example with such a configuration, the user can adjust the rotation amount of the turning shaft 65 to adjust the drawing amount of the reception member 67 in a later period of drawing of the reception member 67 such as upon completion of the drawing of the reception member 67. More specifically, although the reception member 67 is not in contact with the installation surface S in FIG. 3, the reception member 67 can be brought into contact with the installation surface S by further drawing the reception member 67 by adjusting the drawing amount of the reception member 67 by the user, i.e., by rotating the turning shaft 65 from state of FIG. 3 so as to set the position of 67*b* to the position illustrated in FIG. 7 by the user.

In addition, as described above, the recording apparatus 10 of this example includes, at a position between the rack 64 and the turning shaft gear 66, the speed-increasing mechanism 70 that increases the speed of the turning of the turning shaft gear 66 such that the drawing amount of the reception member 67 is greater than the movement amount of the pair of supporting parts 63. With this configuration, it is not necessary to enlarge the turning shaft 65 for winding the reception member 67, and thus the apparatus can be downsized.

Example 2

Figure 11:
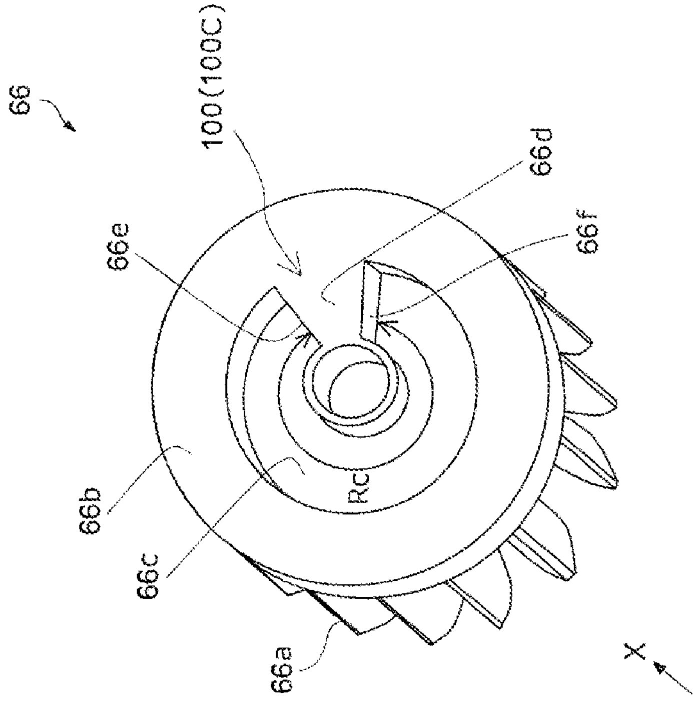
FIG. 11 is a perspective view illustrating a turning shaft gear of a recording apparatus of an example 2.

The recording apparatus 10 of an example 2 is described below with reference to FIG. 11. The configurations of the recording apparatus 10 of this example are the same as those of the recording apparatus 10 of the example 1 except for the configurations described below. Therefore, the recording apparatus 10 of this example has the same characteristic as those of the recording apparatus 10 of the example 1 except for the points described below. In view of this, in FIG. 11, the components common to the example 1 are denoted with the same reference numerals, and the description thereof is omitted.

As described above, in the recording apparatus 10 of the example 1, the toothless region 100A and the toothless region 100B serving as the non-linkage structure 100 are provided in the rack 64. On the other hand, in the recording apparatus 10 of this example, the non-linkage structure 100 is provided in the turning shaft gear 66. Specifically, as illustrated in FIG. 11, the turning shaft gear 66 of the recording apparatus 10 of this example has a configuration in which a recess 66*c* with a C shape as viewed from the X direction is formed in a surface 66*b* where teeth 66*a* are formed on the side opposite to the −X direction side, and a protrusion not illustrated in the figure provided at the turning shaft 65 fits the recess 66*c*. The protrusion of the turning shaft 65 is provided at a position radially shifted from the rotation center of the surface facing the turning shaft gear 66, and the position changes on the concentric circle along with the turning of the turning shaft 65. The protrusion of the turning shaft 65 has a size that allows for the movement inside the recess 66*c* in the state where it is fit to the recess 66*c*. In this manner, the recess 66*c* has a C-shaped protrusion movable range Rc that spans from a first wall part 66*e* to a second wall part 66*f* of a contact part 66*d*, and, while the protrusion moves in the C-shaped protrusion movable range Rc that spans from the first wall part 66*e* to the second wall part 66*f*, the turning shaft 65 does not turn even when the turning shaft gear 66 rotates.

That is, the recording apparatus 10 of this example includes, as the non-linkage structure 100, an idling mechanism 100C in which the turning shaft gear 66 idles on the turning shaft 65 even when the turning shaft gear 66 turns in linkage with the movement of the rack 64. With this configuration, the non-linkage structure 100 can be formed without forming the toothless region 100A and/or the toothless region 100B in the rack 64. According to this example, the state where the turning shaft gear 66 and the rack 64 are engaged with each other is maintained. Thus, even in the case where the rack 64 is provided to both of the paired supporting parts 63, the positional relationship between of the pair of the turning shaft gear 66 and the rack 64 does not change, and the phases of the pairs of the turning shaft gear 66 and the rack 64 are not shifted.

The present disclosure is not limited to the above-described examples, and can be realized in various configurations to the extent that it does not depart from the intent of the disclosure. For example, it is possible to combine the rack 64 including the non-linkage structure 100 such as that of the recording apparatus 10 of the example 1 and the turning shaft gear 66 including the non-linkage structure 100 such as that of the recording apparatus 10 of the example 2. The technical features in the examples corresponding to the technical features in each of the forms described in the SUMMARY section may be replaced or combined as appropriate to solve some or all of the above issues or to achieve some or all of the above effects. Also, if the technical feature is not described as essential in the specification, it can be deleted as appropriate.

What is claimed is:

1. A processing apparatus comprising:

a processing unit housed in a housing and configured to process a medium; and a medium reception unit configured to receive the medium ejected from the housing, wherein the medium reception unit including:

a reception member having a sheet shape with flexibility, a turning shaft provided inside the housing and coupled to one end of the reception member, an operation part coupled to the other end of the reception member and configured to separate from the turning shaft, a pair of supporting parts protruding movably forward and backward from the housing in a forward/backward direction along a separation direction of the operation part from the turning shaft, and support both ends of the operation part, a rack provided at at least one of the pair of supporting parts, and a turning shaft gear provided at the turning shaft and configured to turn in linkage with a movement of the rack, when the operation part approaches the turning shaft, the reception member is wound around the turning shaft and housed inside the housing, when the operation part separates from the turning shaft, the reception member is drawn out from the turning shaft to hang downward such that the medium is receivable, and at least one of the rack and the turning shaft gear has a non-linkage structure in which a movement of the operation part and turning of the turning shaft are temporarily not linked while the operation part is separated from the turning shaft.

2. The processing apparatus according to claim 1, wherein the non-linkage structure includes a toothless region where the turning shaft gear does not turn by not having teeth of the rack in part over one pitch or more of teeth of a gear that fit the teeth of the rack.

3. The processing apparatus according to claim 2, wherein the toothless region is provided on the operation part side of a center, in the forward/backward direction, of the rack.

4. The processing apparatus according to claim 2, wherein the toothless region is provided on an opposite side of a center from the operation part, in the forward/backward direction in the rack.

5. The processing apparatus according to claim 1, wherein the non-linkage structure includes an idling mechanism in which the turning shaft gear idles on the turning shaft even when the turning shaft gear turns in linkage with the movement of the rack.

6. The processing apparatus according to claim 1, further comprising a speed-increasing mechanism provided between the rack and the turning shaft gear and configured to increase a speed of turning of the turning shaft gear such that a drawing amount of the reception member is greater than a movement amount of the pair of supporting parts.

7. A recording apparatus comprising:

a recording unit housed in a housing and configured to perform recording on a medium; and a medium reception unit configured to receive the medium ejected from the housing, wherein the medium reception unit including:

a reception member having a sheet shape with flexibility, a turning shaft provided inside the housing and coupled to one end of the reception member, an operation part coupled to the other end of the reception member and configured to separate from the turning shaft, a pair of supporting parts protruding movably forward and backward from the housing in a forward/backward direction along a separation direction of the operation part from the turning shaft, and support both ends of the operation part, a rack provided at at least one of the pair of supporting parts, and a turning shaft gear provided at the turning shaft and configured to turn in linkage with a movement of the rack, when the operation part approaches the turning shaft, the reception member is wound around the turning shaft and housed inside the housing, when the operation part separates from the turning shaft, the reception member is drawn out from the turning shaft to hang downward such that the medium is receivable, and at least one of the rack and the turning shaft gear has a non-linkage structure in which a movement of the operation part and turning of the turning shaft are temporarily not linked while the operation part is separated from the turning shaft.

* * * * *